United States Patent [19]
Ohana

[11] Patent Number: 5,426,500
[45] Date of Patent: Jun. 20, 1995

[54] ILLUMINANCE MEASUREMENT OF VEHICLE LAMP

[75] Inventor: Kanji Ohana, Hiroshima, Japan

[73] Assignee: Chuo Electronic Measurement Co., Ltd., Hiroshima, Japan

[21] Appl. No.: 177,049

[22] Filed: Jan. 4, 1994

[51] Int. Cl.⁶ .............................................. G01J 1/42
[52] U.S. Cl. ................................. 356/218; 356/121; 33/288
[58] Field of Search ............................ 356/213–217, 356/218, 219, 221, 222, 226, 227, 229, 233, 154, 153, 121, 122; 250/214.1; 33/288, 335, 286, 264, 266, 293; 348/135

[56] References Cited

U.S. PATENT DOCUMENTS

| | | | |
|---|---|---|---|
| 2,977,843 | 4/1961 | Graeber et al. | 356/121 |
| 3,532,432 | 10/1970 | Mansour | 356/153 |
| 3,802,785 | 4/1974 | Hankins et al. | 356/219 |
| 4,120,589 | 10/1978 | Mima et al. | 356/121 |
| 4,647,195 | 3/1987 | Ishikawa et al. | 356/154 |
| 4,948,249 | 8/1990 | Hopkins et al. | 356/121 |
| 5,170,220 | 12/1992 | Matsumoto et al. | 356/154 |

FOREIGN PATENT DOCUMENTS

| | | | |
|---|---|---|---|
| 0065131 | 5/1980 | Japan | 356/218 |
| 0059125 | 4/1982 | Japan | 356/121 |

*Primary Examiner*—Hoa Q. Pham
*Attorney, Agent, or Firm*—Jordan and Hamburg

[57] ABSTRACT

In the method for measuring the illuminance of a vehicle lamp according to the present invention, an image of the light emitted from a headlamp and projected onto a screen is picked up for every pixel, by an imaging device, to detect a gradient of each pixel; an illuminance of the light incident upon illuminance sensors disposed in predetermined positions correspondingly to the screen is detected by each of the illuminance sensors; a function or correlation diagram showing the relationship between the illuminances and gradients is generated based on the gradients corresponding to as many illuminances thus obtained as the illuminance sensors; and the function or correlation diagram is used to detect the illuminance at a position on the screen, the position corresponding to the desired pixel.

11 Claims, 7 Drawing Sheets

ILLUMINANCE MEASUREMENT OF VEHICLE LAMP

BACKGROUND OF THE INVENTION

1. Field of the Invention:

The present invention relates to a method for illuminance measurement of a vehicle lamp such as automotive headlamp.

2. Prior-art Statement

During periodic servicing and inspection of automobiles or in the inspection line following the assembling thereof, the main optical axis of the headlamp is checked to see that the headlamp is correctly fixed. For this purpose, a variety of headlamp testers have been developed.

Generally, conventional headlamp testers of such type use a photosensor such as photocell, etc. However, as more and more types of cars have been produced, the headlamp has also been diversified in type correspondingly and thus it is required to inspect each type of headlamp with high precision.

To this end, a headlamp tester has been proposed which is designed to pick up, by a TV camera, a luminous intensity distribution pattern of a light projected from a headlamp onto a screen, for example, and process the picked-up luminous intensity distribution pattern to check whether the main optical axis of the headlamp is correctly held. With this headlamp tester, it is possible to check the main optical axis with an improved precision and quickly adjust it.

In addition to the main optical axis check as mentioned above, however, the headlamp must be subject to a luminous intensity check. This luminous intensity check is separately done using a dedicated apparatus. Consequently, the luminous intensity check adds to the labor required for the headlamp inspection and requires additional time.

Also, for the above-mentioned headlamp tester, it has been proposed that the image information from the imaging means such as TV camera or the like should be utilized to measure the luminous intensity as well. However, since the TV camera uses an automatically collimated lens, it is not possible to precisely measure the true illuminance on the screen and thus the luminous intensity of the headlamp cannot be calculated.

SUMMARY OF THE INVENTION

Accordingly, it is an object of the present invention to overcome the above-mentioned drawbacks of the prior art by providing a method for illuminance measurement of a vehicle lamp, in which illuminance of a vehicle lamp can be measured based on an image information acquired by means of a TV camera.

The above object is accomplished by providing a method for measuring the illuminance of a vehicle lamp, comprising the following steps of: picking up, by an imaging means, an image of the light emitted from the vehicle lamp and projected onto a screen placed in front of the vehicle lamp while detecting the light from the vehicle lamp by a plurality of illuminance sensors disposed at predetermined positions; detecting an illuminance from the intensity of the light incident upon each of the illuminance sensors while detecting a light gradient of each of pixels of the light image picked up by the imaging means, the positions of the pixels corresponding to those of the pixels of the light image on the screen which correspond to those of the illuminance sensors; generating, based on the gradients corresponding to as many illuminances thus obtained as the illuminance sensors, a function or correlation diagram showing the relationship between the illuminances and gradients; and using the function or correlation diagram to identify, by inverse operation, from the gradient of a desired pixel, an illuminance at a position on the screen, which position corresponding to the desired pixel.

Also the above object is accomplished by providing a method, wherein each of the illuminance sensors is mounted on a sensor plate placed on the optical path on which the light emitted from the headlamp travels as divided by two.

Further, the above object is accomplished by providing a method, wherein the screen also serves as the sensor plate.

DETAILED DESCRIPTION OF THE PREFERRED EMBODIMENTS

The above and other objects and advantages of the present invention will be better understood from the ensuing description made, by way of example, of the embodiments of the present invention with reference to the drawings.

Figure 1:
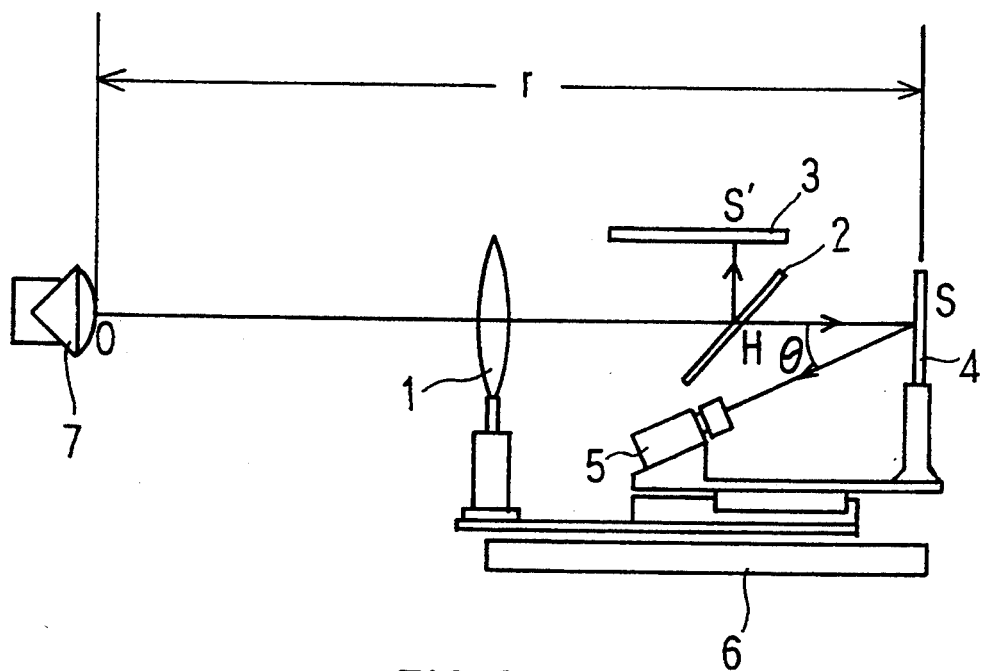
FIG. 1 shows the construction of the illuminance measuring apparatus according to a first embodiment of the present invention, for use in carrying out the method for illuminance measurement of a vehicle lamp according to the present invention.

FIG. 1 shows an illuminance measuring system which carries out the method for illuminance measurement of a vehicle lamp according to the present invention. The system comprises a converging lens 1, half-mirror 2, sensor plate 3, screen 4, imaging means 5 and a calculating means 6. In FIG. 1, the reference symbol O denotes a point from which a light is emitted from the headlamp 7, H a point where the optical axis of the headlamp 7 intersects the half-mirror 2, S a point where the optical axis intersects the screen 4, and S' denotes a point where the optical axis intersects the sensor plate 3.

The lens 1 converges the light emitted from the headlamp 7 under inspection, toward the screen 4.

The half-mirror 2 is so adapted that a portion of the light from the headlamp 7 that the half-mirror 2 reflects with a predetermined reflectance R ($0<R<1$) will be incident upon the sensor plate 3 while a portion that the half-mirror 3 transmits with a predetermined transmittivity T ($0<T<1$) will be incident upon the screen 4.

Figure 2:
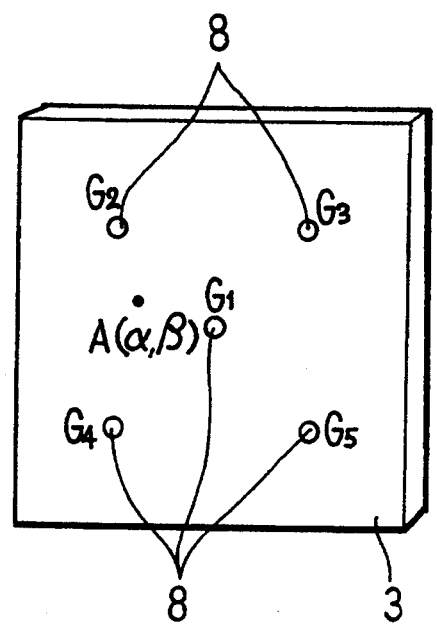
FIG. 2 is a perspective view showing the sensor plate according to the present invention and the fixation of the illuminance sensors on the sensor plate.
Figure 3:
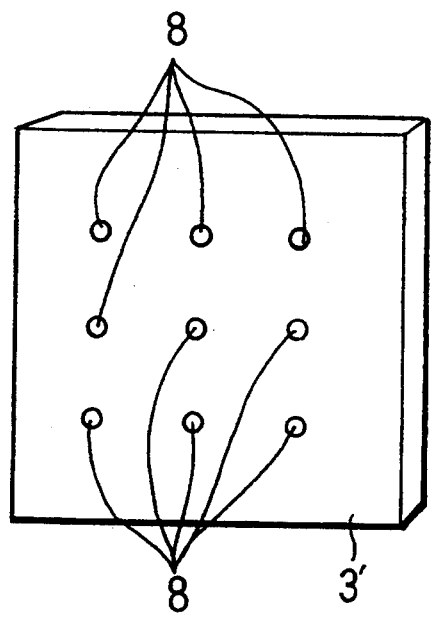
FIG. 3 is a perspective view showing a variant of the disposition of the illuminance sensors on the sensor plate.

The sensor plate 3 is made of a generally rectangular thin plate on which illuminance sensors 8 are disposed, spaced from each other, with a predetermined distance between them. The illuminance sensors 8 in this embodiment count five in number as shown in FIG. 2. The output signals from these illuminance sensors 8 are converted from analog to digital, and a unique conversion formula for each illuminance sensor is used to calculate each illuminance (1x) correctly. The sensor plate 3 is spaced a distance (OHS') from the headlamp 7 which is the light source, and the luminous intensity (Cd) of the headlamp 7 is calculated from the illuminances (1x) detected by the illuminance sensors 8. Specifically, the illuminance sensors 8 may not be distributed on the sensor plate 3 as shown in FIG. 2 but may alternatively be disposed in a 3×3 matrix (9 sensors in total) as shown in FIG. 3, for example. Even with less sensors, however, it is possible to detect the illuminance at the optical axis on the screen 4.

The light emitted from the headlamp 7 and projected onto the screen 4 is picked up by the imaging means 5 and the picked-up light image is subjected to a predetermined image processing, etc. to detect the main optical axis of the headlamp 7, and the information on a position A ($\alpha$ and $\beta$) corresponding to the detected main optical axis can be used by the calculating means 6 to determine the illuminance and luminous intensity at the position A $\alpha$ and $\beta$) on the sensor plate 3, corresponding to the position A ($\alpha$ and $\beta$).

Figure 4:
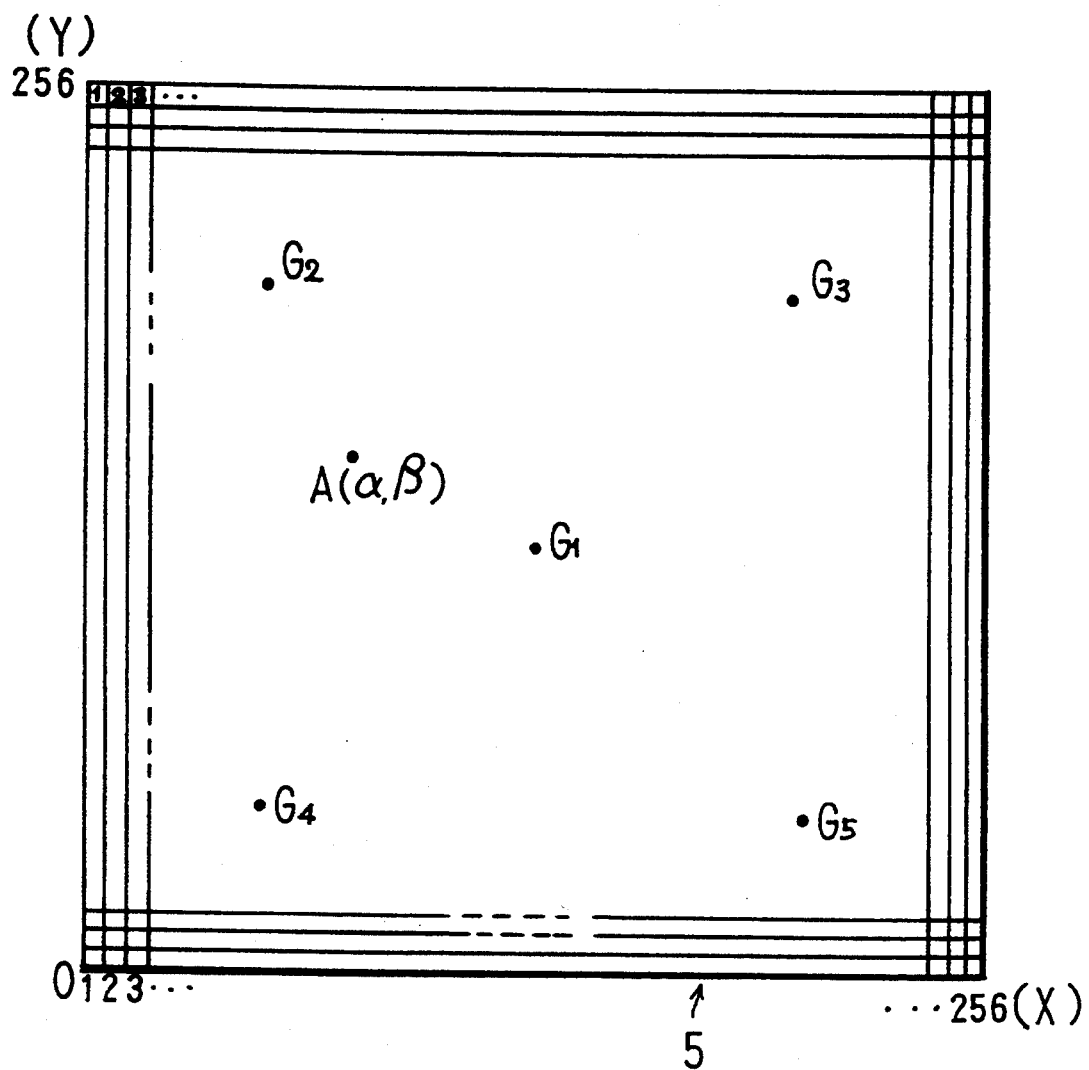
FIG. 4 is a drawing illustrating the disposition of pixels forming together the imaging means according to the present invention.

The imaging means 5 uses a TV camera with an automatically collimated lens. In this embodiment, a CCD (charge coupled device) is provided for each of 256 pixels (vertical: Y-axis) by 256 pixels (horizontal: X-axis) as shown in FIG. 4, namely, for each of the pixels in a 256×256 matrix to pick up the light image on the screen 4. The signal from the CCD for each pixel can be used to measure the gradient of the light at each position on the screen 4 because CCDs correspond to pixels, respectively, on the screen. In this embodiment, the output signals from CCDs for all the pixels on the screen 4 are used to immediately detect to which of the 513 gradients 0 to 512 each of the screen portions corresponding to all the 256×256 pixels belongs..

The calculating means 6 is connected at the input thereof to the outputs of the illuminance sensors 8 and of the CCDs. Collating the information on the illuminance signals from the illuminance sensors 8 on the sensor plate 3 with the information on the gradients of the pixels on the screen 4, which are supplied from the CCDs of the imaging means 5, the calculating means 6 generates a correlation diagram (or function) showing the correlation between the gradients and illuminances as shown in FIG. 5, and interpolates, based on the correlation diagram (or function), the illuminances at other positions (X, Y) on the sensor plate 3 than those where the illuminance sensors 8 are provided.

Next, the method for illuminance measurement according to the present invention will be discussed below with reference to the aforementioned illuminance measuring apparatus.

Figure 5:
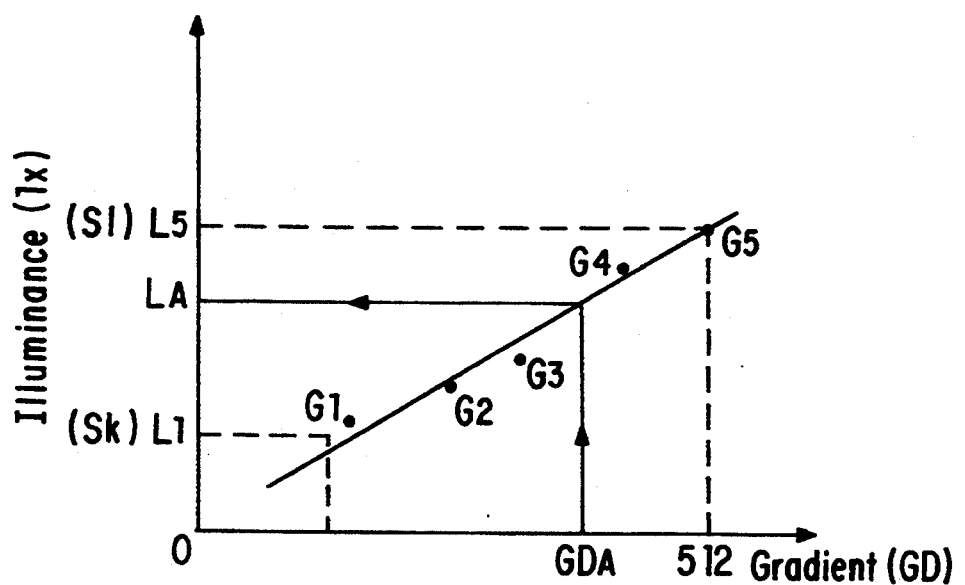
FIG. 5 is a correlation diagram showing the correlation between the gradients and illuminances, detected by the CCDs of the imaging means, which pick up the pixels of the light image on the screen.

(I) Based on an inherent illuminance (1x) obtained directly from each of the five illuminance sensors 8 on the sensor plate 3 and a gradient supplied from a CCD for each of the pixels on the screen 4, that corresponds to each of the illuminance sensors 8, a rectangular coordinate is set which has gradients along the horizontal axis thereof and illuminances along the vertical axis thereof and 5 points ($G_1$ to $G_5$), are plotted in this rectangular coordinate, shown in FIG. 5. The data as for these five points are fed into the calculating means 6 and subject to a calculation by least square method to provide a fitting function (linear function) by which these points are connected to each other into a line, and to depict a fitting line in the diagram in FIG. 5 (first step 10 in FIG. 6).

Figure 6:
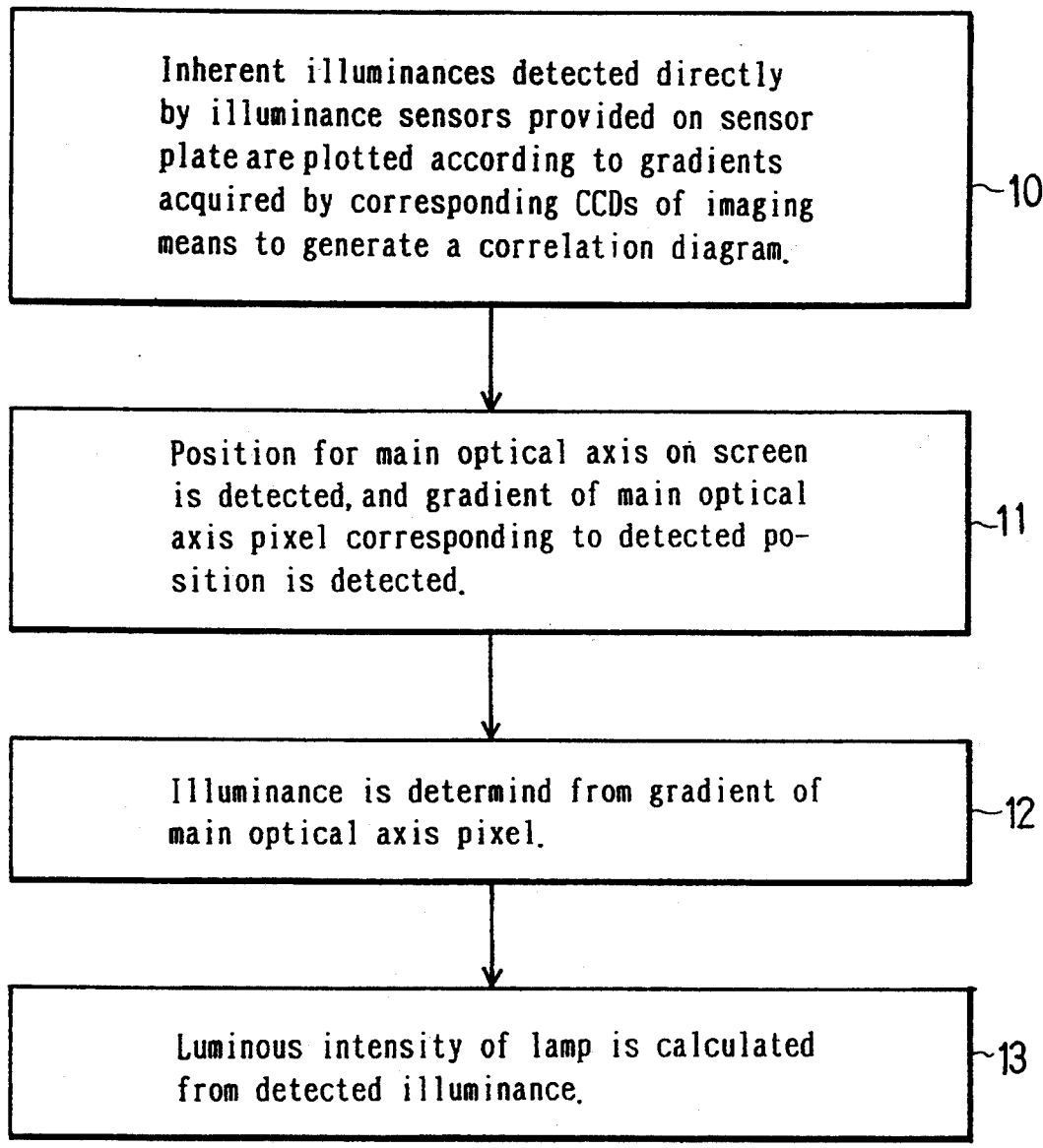
FIG. 6 is a flow chart showing the illuminance measuring method according to the present invention.

(II) The image information obtained by the imaging means 5 is subject to a predetermined image processing to detect the position A ($\alpha,\beta$) of the main optical axis on the screen 4, and also gradient ($GD_A$) from a CCD for a pixel (will be referred to as "main optical axis pixel" hereafter), picked up by the TV camera, for the main optical axis at the position A (second step 11 in FIG. 6).

(III) An illuminance ($L_A$), on the screen 4, corresponding to the gradient ($GD_A$) of the main optical axis pixel, detected using the correlation diagram (or function) obtained at the first step 10, is identified by an inverse operation (third step 12 in FIG. 6).

(IV) The illuminance ($I_A$) of the headlamp is calculated based on the identified screen illuminance ($L_A$) by using a following predetermined formula (fourth step 13):

$$I_A L_A r^2 / \cos \theta;$$

where r: Distance (in m) between headlamp 7 and screen 4

$\theta$: Angle defined by normal line to optical axis position on screen 4 and projected light.

Next, the illuminance measuring apparatus which carries out the method for illuminance measurement of vehicle lamp according to the present invention will be described with reference to FIGS. 7 to 10. Note that the same elements as in the aforementioned first embodiment will be indicated with the same reference numerals but will not be discussed any more below.

Figure 7:
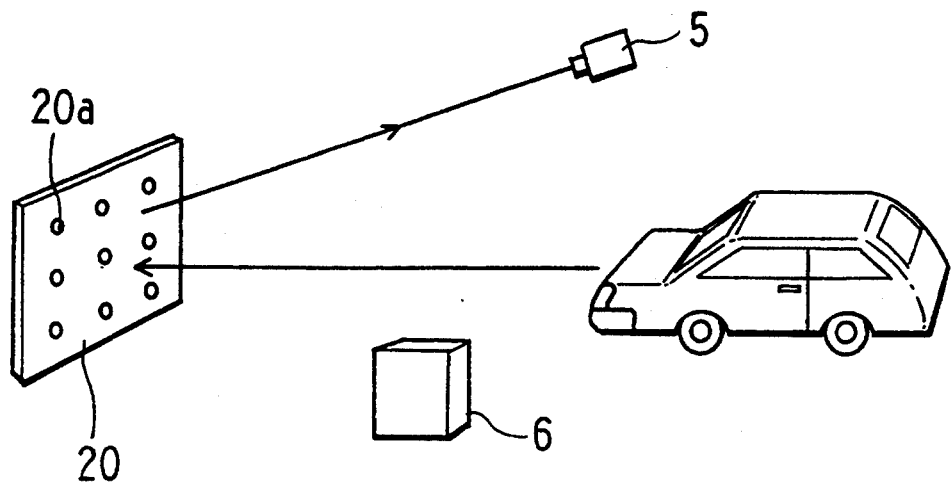
FIG. 7 shows the construction of the illuminance measuring apparatus according to a second embodiment of the present invention, for use in carrying out the illuminance measuring method according to the present invention.

FIG. 7 shows an illuminance measuring apparatus according to the second embodiment of the present invention. The apparatus comprises a screen 20, imaging means 5 and a calculating means 6.

The screen 20 receives the light emitted from a headlamp under inspection to detect the illuminance of the headlamp. For this purpose, the screen 20 has illuminance sensors 8 disposed thereon in a predetermined pattern and of which the outputs are connected to the input of the calculating means 6.

Figure 8:
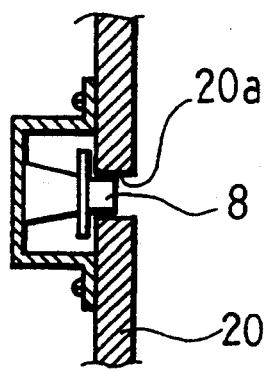
FIG. 8 is a sectional view of the screen according to the second embodiment of the present invention, in which illuminance sensors are provided.
Figure 9:
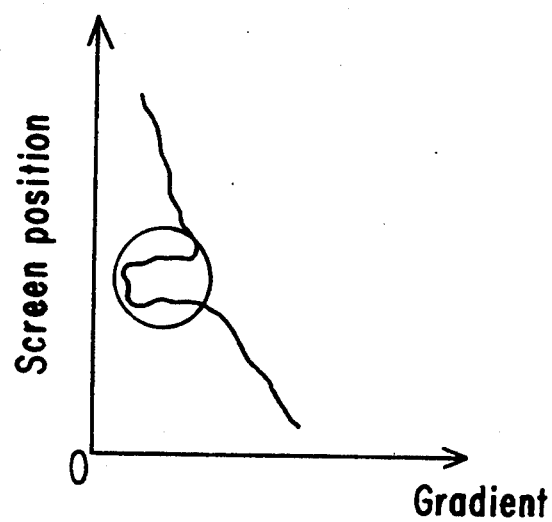
FIG. 9 is a graph showing the abrupt decrease of the gradient detected by the imaging means when the screen shown in FIG. 8 is used.
Figure 10:
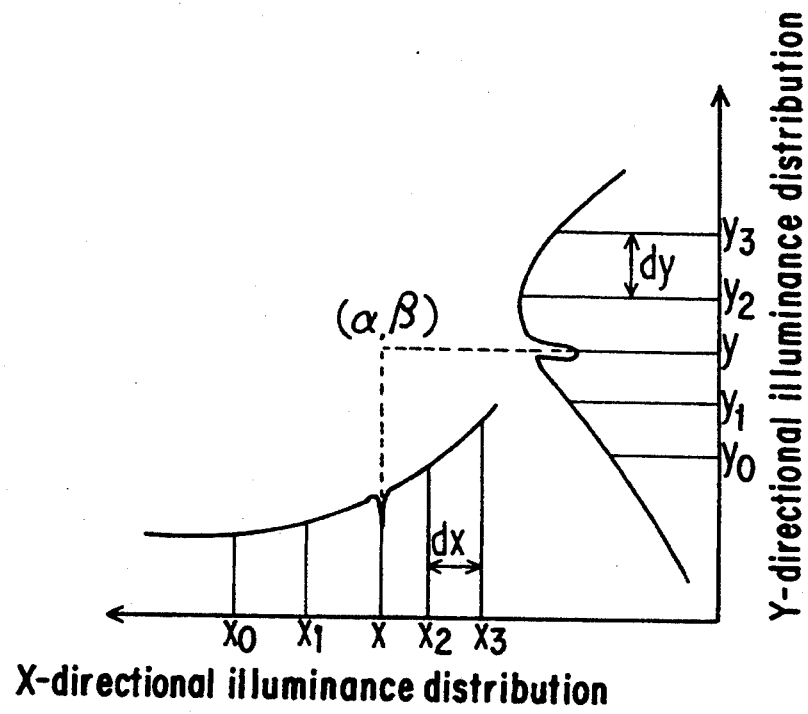
FIG. 10 is a graph showing the abrupt decrease of illuminance caused when the screen shown in FIG. 8 is used.

As shown in FIG. 8, the illuminance sensor 8 is fixed in apertures 20a formed in the screen 20. It should be noted that the provision of the illuminance sensor 8 in the apertures 20a formed in the screen 20 causes an abrupt decrease of the gradient corresponding to the luminous intensity distribution pattern, picked up by the CCD of the imaging means 5, of the light emitted from the headlamp and which is formed on the screen 20. However, an appropriate method of interpolation can be used to correct and fit the decrease of gradient to a smooth curve. Thereby, the abrupt decrease of illuminance caused by the provision of the illuminance sensors 8 in the apertures 20a in the screen 20 can be effectively compensated in calculating the illuminance as shown in FIG. 10.

In the foregoing, the embodiments of the present invention have been discussed in which the gradient (GD) and illuminance (1x) are in a linear relation as shown in FIG. 5. However, the function used to show this correlation is not limited to the linear function but it may be of course any of quadratic or higher-degree functions and special functions.

As having been described in the foregoing, the method for illuminance measurement of a vehicle lamp according to the present invention can be used as follows. The image of light projected from the headlamp onto the screen is picked up pixel by pixel by the imaging means to measure the gradient of each pixel. The light emitted from the lamp is also incident upon the illuminance sensors provided at predetermined positions corresponding to the light-incident positions on the screen and thus the illuminances of the incident light rays are determined by the illuminance sensors. The light gradients of the pixels at the positions corresponding to the illuminance sensors and the illuminances measured by the illuminance sensors are used to generate a function or correlation diagram showing the relationship between the gradients and illuminances of the headlamp under inspection. The function or correlation diagram is be used to measure from the gradient of a selected pixel the illuminance at a position on the screen, which position corresponds to the pixel. Thus, the main optical axis can be measured by the imaging means, and the illuminance in a position on the screen corresponding to the main optical axis and also the luminous intensity of the headlamp can be calculated nearly simultaneously, thereby permitting rapid inspection and adjustment of a headlamp.

What is claimed is:

1. A method for measuring the illuminance of a vehicle lamp under inspection, comprising the following steps of:
    picking up, by an imaging means having pixels, an image of light emitted from the vehicle lamp and projected onto a screen placed in front of the vehicle lamp while detecting the light from the vehicle lamp by a plurality of illuminance sensors disposed at predetermined positions;
    detecting an illuminance from an intensity of the light incident upon each of the illuminance sensors while detecting a light gradient of each of the pixels of the light image picked up by the imaging means, the positions of the pixels corresponding to those of the pixels of the light image on the screen which correspond to those of the illuminance sensors;
    generating, based on the gradients coresponding to as many illuminances thus obtained as the illuminance sensors, a correlation function showing the relationship between the illuminances and gradients; and
    using the correlation function to identify, by inverse operation, from the gradient of a desired pixel, an illuminance at a position on the screen, which position corresponds to the desired pixel.

2. A method according to claim 1, wherein each of the illuminance sensors is mounted on a sensor plate placed on an optical path on which the light emitted from the headlamp travels as divided by two.

3. A method according to claim 2, wherein the screen also serves as the sensor plate.

4. A method for measurement of an illuminance of a vehicle lamp under inspection comprising the steps of:
    focusing an image of light emitted from the vehicle lamp on at least one screen;
    detecting a screen illuminance at a plurality of points within the focused image while also converting the focused image into a pixel matrix of pixel output values, the plurality of points corresponding to discrete pixels of the pixel matrix, the corresponding discrete pixels each having a gradient;
    generating a correlation function relating screen illuminance to gradient based on the plurality of points and the corresponding discrete pixels; and
    calculating a screen illuminance for a desired location on the screen from a gradient of a pixel corresponding to the desired location, according to the correlation function.

5. The method according to claim 4, further comprising the step of determining the illuminance of the vehicle lamp from the screen illuminance, according to an adjustment function relating screen illuminance to illuminance of the vehicle lamp, the adjustment function including as a parameter a distance between the vehicle lamp and the screen.

6. The method according to claim 5, wherein the step of converting the focused image into the pixel matrix includes gathering a reflected image from the screen at an incident angle, the adjustment function further including as a parameter the incident angle.

7. The method according to claim 4, wherein the step of focusing includes interposing a beam splitter in a light beam from the vehicle lamp after a focusing means to permit the focusing of the image onto first and second screens, the first screen including means for determining the illuminance of the plurality of points, and the second screen including means for reflecting the image focused thereon for conversion thereof into a matrix of pixel values.

8. A method for simultaneously determining a degree of alignment of a main optical axis of a vehicle lamp under inspection, and measurement of an illuminance of the vehicle lamp along the main optical axis, the method comprising the steps of:
    focusing an image of light emitted from the vehicle lamp on at least one screen;
    detecting a screen illuminance at a plurality of points within the focused image while also converting the focused image into a pixel matrix, a greatest pixel value of the pixel matrix representing a position at which the main optical axis intersects the screen, the plurality of points corresponding to discrete pixels of the pixel matrix, the corresponding discrete pixels each having a gradient;
    generating a correlation function relating screen illuminance to gradient based on the plurality of points and corresponding discrete pixel values; and
    calculating a screen illuminance for the position at which the main optical axis intersects the screen from a gradient of the greatest pixel value, according to the correlation function.

9. The method according to claim 8, further comprising the step of determining the illuminance of the vehicle lamp along the main optical axis from the maximum screen illuminance, according to an adjustment function relating screen illuminance to illuminance of the vehicle lamp, the adjustment function including as a parameter a distance between the vehicle lamp and the screen.

10. The method according to claim 9, wherein the step of converting the focused image into the pixel matrix includes gathering a reflected image from the screen at an incident angle, the adjustment function further including as a parameter the incident angle.

11. The method according to claim 8, wherein the step of focusing includes interposing a beam Splitter in a light beam from the vehicle lamp, after a focusing means, to permit focusing of the image onto first and second screens, the first screen including means for determining the illuminance of the plurality of points, and the second screen including means for reflecting the image focused thereon for conversion into a matrix of pixel values

* * * * *